United States Patent [19]

Onoue et al.

[11] Patent Number: 5,085,604

[45] Date of Patent: Feb. 4, 1992

[54] RELIEF VALVE FOR TILT DEVICE

[75] Inventors: Akihiro Onoue, Hamamatsu; Hideki Saitoh; Masahiro Furuki, both of Numazu, all of Japan

[73] Assignee: Sanshin Kogyo Kabushiki Kaisha, Hamamatsu, Japan

[21] Appl. No.: 619,667

[22] Filed: Nov. 28, 1990

Related U.S. Application Data

[63] Continuation of Ser. No. 380,093, Jul. 14, 1989, abandoned.

[30] Foreign Application Priority Data

Jul. 15, 1988 [JP] Japan .................................. 63-175097

[51] Int. Cl.$^5$ ............................................. F16K 15/08
[52] U.S. Cl. ........................................ 440/61; 137/508
[58] Field of Search .................... 137/508, 901; 440/61

[56] References Cited

U.S. PATENT DOCUMENTS

| 2,004,822 | 6/1935 | Mercier | 137/508 X |
| 2,693,821 | 11/1954 | Cornelius | 137/508 |
| 2,845,088 | 7/1958 | Cransman et al. | 137/508 |
| 3,059,692 | 10/1962 | Smitley | 137/508 X |
| 4,137,941 | 2/1979 | Gonin | 137/508 |
| 4,204,560 | 5/1980 | Eriksen | 137/508 |
| 4,565,528 | 1/1986 | Nakase | 440/61 X |

Primary Examiner—Stephen M. Hepperle
Attorney, Agent, or Firm—Ernest A. Beutler

[57] ABSTRACT

A hydraulic circuit for a tilt and trim unit of a marine outboard drive including an improved relief valve that has application in other uses. The relief valve includes a movable valve seat member and a movable valve member and the valve member is urged by the fluid pressure to be relieved into engagement with the valve seat member so that the seating pressure increases as the fluid pressure increases. When the set pressure is reached, the valve seat member is permitted to move away from the valve member, which is then held by a stop, so as to provide pressure relief.

9 Claims, 4 Drawing Sheets

RELIEF VALVE FOR TILT DEVICE

This is a continuation of U.S. patent application Ser. No. 07/380,093, now abandoned, filed July 14, 1989.

BACKGROUND OF THE INVENTION

This invention relates to a relief valve for a tilt device and more particularly to an improved relief valve for a hydraulic circuit.

Relief valves are utilized for a wide variety of purposes and in a wide variety of applications. For example, a relief valve or a series of relief valves are employed in the hydraulic tilt and trim units for marine propulsion devices so as to protect against excess pressure in the systems. Although such devices have a wide variety of application, the conventional prior art type of relief valve has certain disadvantages which will be discussed.

In a conventional hydraulic relief valve, a movable valve member is biased into engagement with a valve seat and holds a communication passageway closed between the pressure side of the hydraulic circuit and a relief side. When the pressure on the pressure side exceeds the spring pressure or biasing pressure on the valve member, the valve member will open and relieve the pressure until a normal pressure is returned at which time the valve will again seat. Although in theory this is a very practical type of device, the fact that the conventional relief valve must be held against fluid pressure in its closed position, means that this type of valve has its seating pressure inversely related to the pressure in the hydraulic circuit. As a result, some leakage tends to occur with these valves. In addition, the conventional type of relief valve is prone to having foreign matter be trapped between the valve member and its seat that can give rise to additional leakage.

These problems may be best understood by reference to FIGS. 1, 2 and 3 wherein a conventional type of relief valve is shown in FIG. 1. FIG. 2 shows the leakage rate of this type of valve in relation to pressure by the curve A while FIG. 3 shows the sealing force S in relation to pressure, against by the curve A.

Referring specifically to FIG. 1, a conventional prior art type of relief valve is indicated by the reference numeral 11 and includes a valve housing 12 in which a high pressure passageway 13 is provided that communicates with the appropriate pressure conduit in which pressure is to be controlled. A valve seat 14 is formed at the end of the passageway 13 and a ball type check valve 15 is normally urged into engagement with the valve seat 14 by a coil compression spring 16 and spring retainer 17. When the pressure in the passageway 13 exceeds the seating pressure applied on the valve 15 by the spring 16, the valve 15 will open to permit flow into a chamber 18 and be discharged through a return passgeway 19 to the reservoir or a lower pressure area. Once the pressure has been relieved, the valve element 15 will again seat.

As may be clearly seen in FIG. 3, the seating force S is inversely related to the pressure P in the conduit 13. This is because the spring 16 must act against the pressure to hold the valve in the closed position. As a result of this, at a predetermined pressure less than the pressure $P_o$, certain leakage will occur which leakage increases as the pressure increases until the point $P_o$ at which time the valve will fully open. As a result, there is the likelihood of leakage and pressure loss before the desired pressure to be relieved exists.

In addition to these difficulties, foreign material may become lodged in the area of the valve seat 14 and prevent full seating which can give rise to greater leakage problems.

It is, therefore, a principal object of this invention to provide an improved relief valve.

It is a further object of this invention to provide a relief valve wherein the seating pressure is directly related to the pressure in the conduit where the pressure is to be relieved until the relief pressure is reached.

It is a further object of the invention to provide an improved relief valve of the type wherein leakage of the valve due to foreign materials can be substantially reduced.

SUMMARY OF THE INVENTION

This invention is adapted to be embodied in a relief valve arrangement for a hydraulic system that is comprised of a fluid chamber having a high pressure fluid inlet and a fluid outlet. A valve seat member is movably supported within the chamber and defines a passage between the fluid inlet and the fluid outlet. The valve seat member has an area that is exposed to the fluid pressure at the fluid inlet and which tends to move the valve seat member in a first direction. Biasing means urge the valve seat member in a second direction opposite to the first direction. A valve member is movable relative to the valve seat member from a first opened position to a closed position wherein the flow through the valve seat member passage is precluded. The fluid pressure in the fluid inlet is effective on the valve member for urging the valve member to its closed position. A stop member is further provided which will permit movement of the valve seat member from a first position to a second position and which will prevent movement of the valve member beyond a predetermined position so that when the pressure in the fluid inlet exceeds the biasing pressure of the biasing means on the valve seat member, the valve seat member may move away from the valve member to open the passage and permit relief flow.

DETAILED DESCRIPTION OF THE PREFERRED EMBODIMENT

Figure 4:
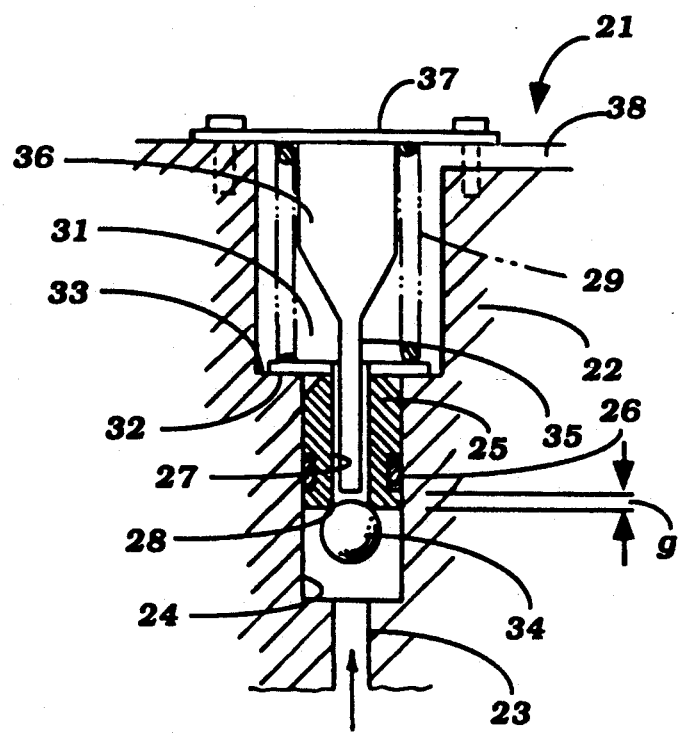
FIG. 4 is a cross-sectional view taken through a relief valve constructed in accordance with an embodiment of the invention.

Referring first to FIG. 4, a relief valve constructed in accordance with an embodiment of the invention is identified generally by the reference numeral 21. The relief valve 21, like a conventional relief valve, includes a valve housing 22 in which a high pressure inlet port 23 is formed. The inlet port 23 communicates with the fluid system in which the pressure is to be controlled and relieved.

The inlet port 23 intersects a bore 24 in which a valve seat member 25 is slidably supported. The valve seat member 25 carries an 0-ring seal 26 so as to provide a seal between the outer periphery of the valve seat member 25 and the bore 24. A through passageway 27 is also formed in the valve seat member 25 and terminates at a valve seat area 28 that is juxtaposed to the inlet port 23.

The fluid pressure in the chamber 24 from the inlet port 23 acts on the area of the valve seat member 25 around its valve seating surface 28 so as to urge is in an upward direction as seen in FIG. 4. The valve seat member 25 is normally held in a first or closed position by means of a coil compression spring 29 that is received within a counterbore 31 formed at the base of the bore 24. The spring 29 acts against a washer 32 and engages the valve seat member 25 so as to hold it in this first position. This position is defined by a shoulder 33 that is formed where the counterbore 31 intersects the bore 24.

A ball type valve member 34 is positioned within the chamber 24 and normally will fall by gravity when there is no pressure against the inlet port 23. However, when the inlet port 23 is pressurized, the valve member 34 will move upwardly and seal the valve seating surface 28 so as to prevent fluid leadkage. It should be noted that a plurality of circumferentially spaced ribs may be formed for controlling the initial movement of the valve member 34 around the bore 24. However, such ribs are generally unnecessary.

A cylindrical valve stop 35 has a base portion 36 that is affixed to a retainer plate 37 that holds the stop 35 and also forms a reaction surface for the spring 29. The stop 35 has its lower end normally spaced a distance g from the valve member 34 under normal flow conditions, for a reason which will become apparent.

A relief passageway 38 extends back from the counterbore 31 to a low pressure source such as a sump.

Figure 1:
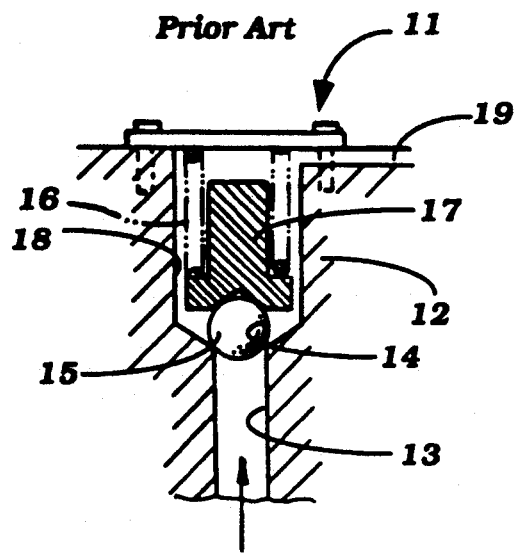
FIG. 1 is a cross-sectional view taken through a relief valve constructed in accordance with the prior art.
Figure 2:
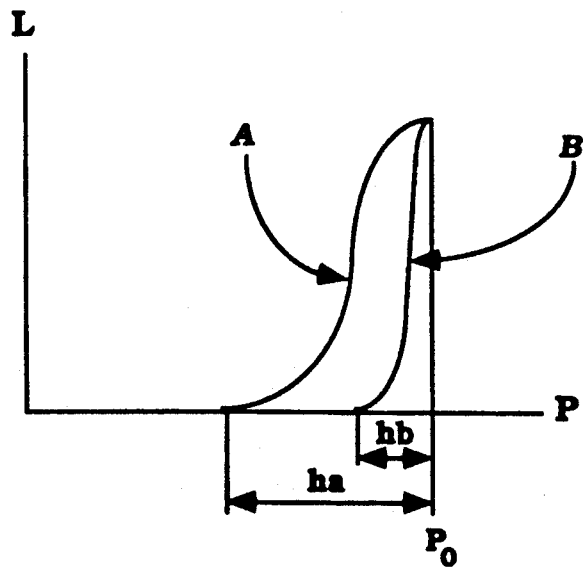
FIG. 2 is a graphical view showing leakage L in relation to pressure P.
Figure 3:
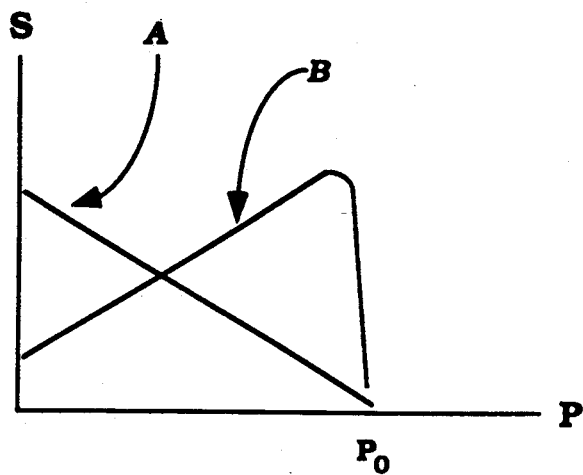
FIG. 3 is a graphical view showing seating force S in relation to pressure P.

It should be noted that as the pressure on the fluid inlet port 23 increases, the sealing pressure on the ball valve 34 will actually increase rather than decrease as is shown by the curve B in FIG. 3. As a result, there is substantially no leakage which will occur as shown by the curve B in FIG. 2 and this will insure good valve action.

As the pressure continues to increase, eventually the valve seat member 25 and valve member 34 will move through the distance g so that the valve member 34 is held against further movement. This occurs when the pressure reaches the point $P_o$. At this point in time, continued movement of the valve seat member 25 away from the valve member 34 will cause opening of the valve and a relief flow.

It should be readily apparent that this form of relief valve is much more effective in providing adequate pressure control and also will avoid the likelihood that foreign contaminants can cause undesired leakage.

Figure 5:
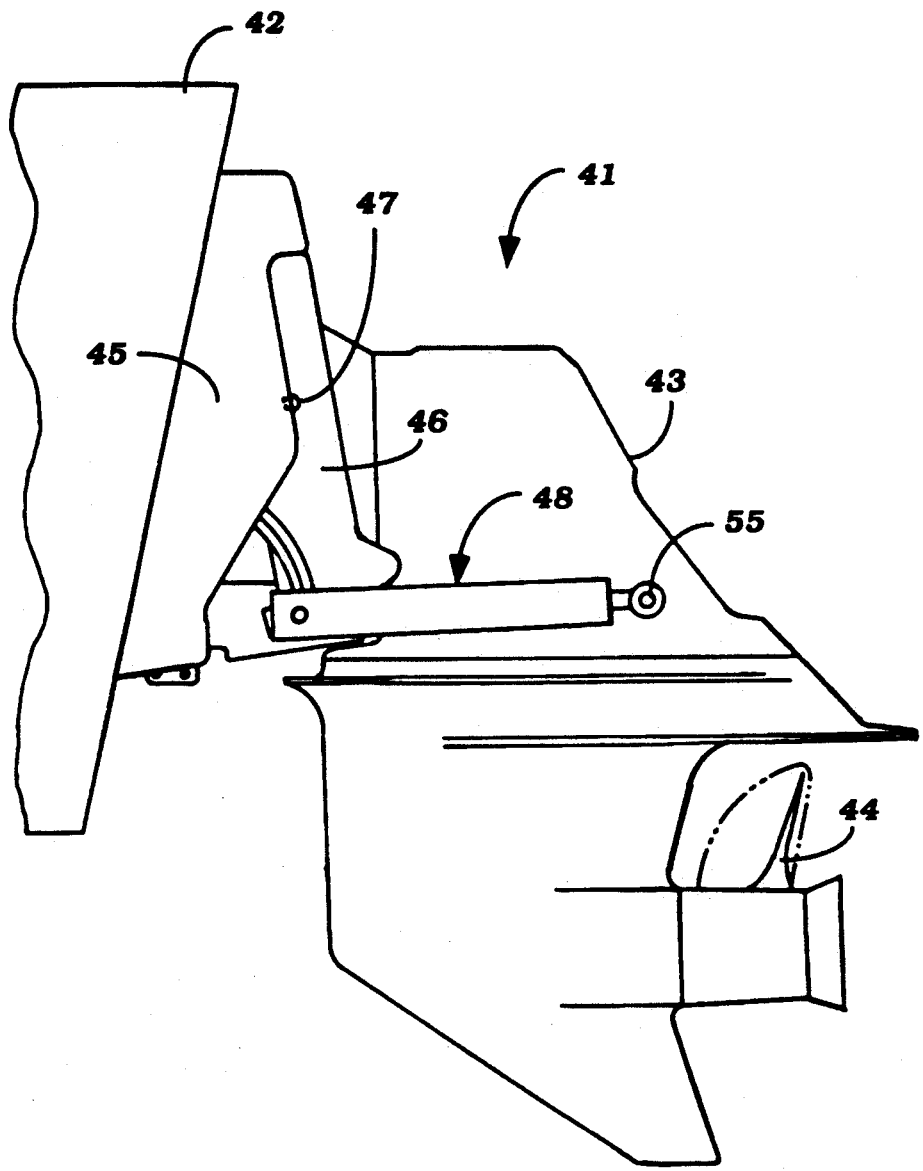
FIG. 5 is a side elevational view of a marine outboard drive constructed in accordance with an embodiment of the invention.
Figure 6:
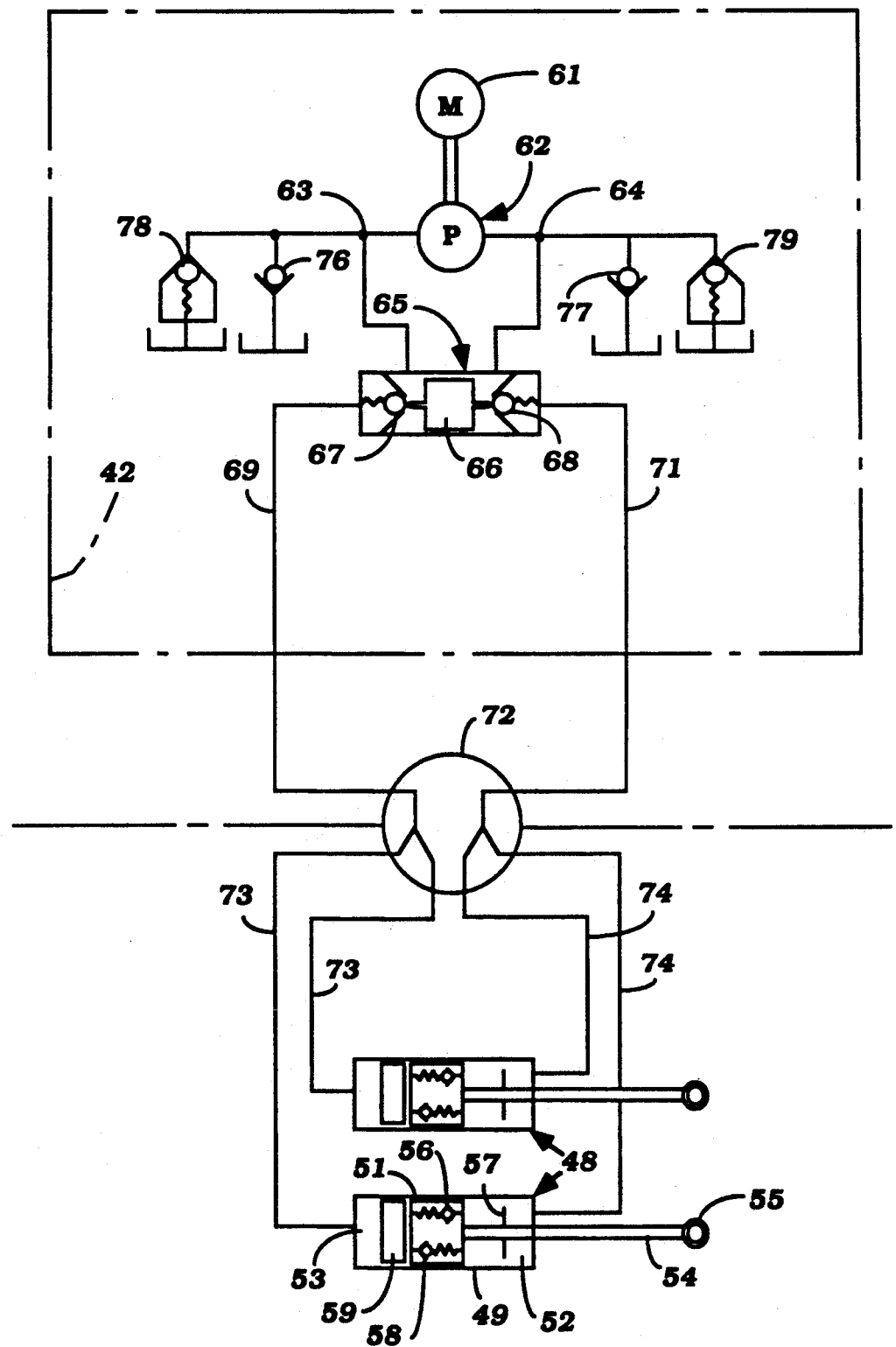
FIG. 6 is a schematic view showing the hydraulic circuitry of the marine outboard drive in FIG. 5 and applications for the relief valves constructed in accordance with the invention.

Referring now to FIGS. 5 and 6, these figures show how this type of relief valve 21 may be employed in a fluid circuit. In the illustrated embodiment, the fluid circuit is associated with a marine outboard drive, indicated generally by the refernce numeral 41. The outboard drive 41 is comprised of an inboard, outboard unit having an inboard mounted internal combustion engine contained within a hull 42 of a watercraft and which is not shown. This drives an outboard drive unit 43 and specifically a propeller 44 associated therewith in a known manner. Although an inboard, outboard drive unit is shown, the invention may also be utilized in conjunction with the power tilt and trim units employed with outboard motors. Of course, the invention can also be used in various other types of hydraulic circuits, as will become apparent to those skilled in the art.

A transom bracket 45 is affixed to the transom of the hull 42 and supports a gimbal ring 46 for steering movement about a generally vertically extending axis. The gimbal ring 46 supports the outboard drive unit 43 for tilt and trim movement about a horizontally disposed axis defined by a pair of pins 47. A pair of hydraulic cylinders 48 are interconnected between the gimbal ring 46 and the unit 43 so as to control the tilt and trim of the outboard drive by means of a hydraulic circuit shown in FIG. 6 and which will now be described.

As may be seen in FIG. 6, the hydraulic cylinders 48 are comprised of outer housings 49 in which pistons 51 are slidably supported and which define a pair of opposite fluid chambers 52 and 53. A piston rod 54 is affixed to the piston 51 and extends through the chamber 52 for connection to the outboard drive unit 43 by means of a pivot pin 55.

A hydraulic shock absorber valve 56 communicates the chamber 52 with the chamber 53 when an underwater obstacle is struck with sufficient force so as to permit the outboard drive unit 43 to pop up and prevent damage. A valve restricter plate 57 is positioned within the chamber 52 for increasing the force necessary to cause the outboard drive unit 43 to pop up more than a predetermined amount. When the underwater obstacle is cleared, the outboard drive unit 43 may return to its normal position with fluid flowing from the chamber 53 back to the chamber 52 through an absorber valve 58.

A floating piston 59 is positioned within the chamber 53 so as to establish the normal trim position of the outboard drive unit 43 as is well known in this art.

In addition to the shock absorbing characteristics provided by the cylinders 48, they also act as fluid motors to permit power tilt and trim adjustment. To this end, the system is pressurized selectively by an arrangement shown schematically in FIG. 6 and wherein certain components of this system are positioned within the hull 42 of the watercraft as shown by the phantom line. These units include a reversible electrical motor 61 that is operated by a suitable operator control and which drives a reversible fluid pump 62. The pump 62 has a pair of ports 63 and 64 which are connected by means of conduits to opposite sides of a shuttle valve assembly 65.

The shuttle valve assembly 65 includes a shuttle piston 66 that has a pair of projections which can open check valves 67 and 68 in a manner to be described and which establish communication with conduits 69 and 71. The conduit 69 is connected by means of a manifold 72 that is positioned outboard of the hull 42 with a pair of conduits 73 that extend to the chambers 53 of the fluid cylinders 49.

In a similar manner, the manifold 72 connects the conduit 71 with a pair of conduits 74 that extend to the chambers 52 of the fluid cylinders 48.

The hydraulic system further includes a sump or fluid reservoir 75 and this reservoir connects with the ports 63 and 64 through respective check valves 76 and 77 so as to permit makeup fluid to be drawn into the hydraulic system so as to compensate for the variations in fluid in the system which occur due to the amount of immersion of the piston rods 54 into the chambers 52.

There are further provided a tilt up pressure relief valve 78 and a tilt down relief valve 79 which communicate with the ports 63 and 64 to provide pressure relief. These valves 78 and 79 have a construction like the construction of the valve 21 shown in FIG. 4 and thus have the advantages of this valve assembly.

The system operates in the following manner. If trim up operation is desired, the electric motor 61 drives the pump 62 in a direction so that the port 63 will be pressurized and the port 64 will act as a return port. When the port 63 is pressurized, the pressure to the left of the shuttle piston 66 will be sufficient to cause it to move to the right and unseat the check valve 68 so that this check valve acts as a return valve. The pressure on the left side of the shuttle piston 66 is sufficiently high so as to unseat the ball check valve 67 and pressurize the line 69 and the line 73. As a result, the chambers 53 of the fluid motor cylinders 48 will be pressurized and the pistons 51 will move to the right as seen in FIG. 6.

Under this condition, fluid can be exhausted from the chambers 52 through the lines 54 and 71 and pass the unseated check valves 68 back to the port 64.

If the tilt or trim up operation is continued until the pistons 51 reach the ends of their strokes, a high pressure rise will be exerted in the port 63 and the relief valve 78 will open to prevent damage in the manner described in conjunction with FIG. 4.

During tilt or trim down operation, the motor 61 is rotated in a direction so that the pump 62 pressurizes the port 64 and the port 63 acts as a return port. When this occurs, the shuttle piston 66 moves to the left and unseats the check valves 67 while the pressure in the conduit will unseat the check valve 68 and pressurize the lines 71 and 74. This will cause the pistons 51 to move to the left and the fluid will be returned through the lines 73 and 69 and unseated check valves 67 to the pump port 63.

If tilt down operation is continued until the pistons 51 reach the other extreme of their position, the pressure in the port 64 will rise suddenly and the relief valve 79 will open in the manner previously described so as to protect the fluid system.

It should be readily apparent that a very effective and trouble free relief valve has been disclosed and that this has a wide variety of practical applications including the hydraulic tilt and trim unit for a marine outboard drive as described. In addition to this application and the described relief valve construction, which is that of a preferred embodiment, various changes, modifications and variations may be made without departing from the spirit and scope of the invention, as defined by the appended claims.

We claim:

1. A relief valve arrangement for a hydraulic system in an outboard drive unit having a transom bracket affixed to a hull of a watercraft, pivot means for rotatably securing said outboard drive unit to said transom bracket for tilt and trim movement about a generally horizontally disposed axis, and a tilt device for controlling the tilt and trim of said outboard drive unit, said relief valve arrangement being embodied in said tilt device and comprising a fluid chamber defined by a bore and having a high pressure fluid inlet formed in a wall closing one end of said bore and a fluid outlet spaced from said bore, a unitary, annular valve seat member having its outer periphery slideably directed by said bore and having an internal opening defining a passage between said fluid inlet and said fluid outlet, said valve seat member having an area exposed to the fluid pressure at said fluid inlet tending to move said valve seat member in a first direction, biasing means urging said valve seat member in a second direction opposite to said first direction, a valve member engagable with said valve seat member solely by the pressure introduced through said fluid inlet and movable within said bore relative to said valve seat member from a first opened position to a second closed position wherein the flow through said valve seat member passage is precluded, first stop means for limiting the degree of movement of said valve member in said first direction for permitting said valve seat member to move away from said valve member and open said passage for relief of pressure in said fluid inlet through flow through said passage to said fluid outlet, and an adjustable retainer plate to which said first stop means is affixed and which forms a reaction surface for said biasing means.

2. A relief valve arrangement as set forth in claim 1 further including means for providing a second stop for limiting the movement of the valve seat member in the second direction.

3. A relief valve arrangement as set forth in claim 2 wherein the second stop comprises a shoulder against which the biasing force of the biasing means is limited.

4. A relief valve arrangement as set forth in claim 1 wherein the passage comprises a bore extending through the valve seat member.

5. A relief valve arrangement as set forth in claim 1 wherein the valve member comprises a ball positioned in the bore between the fluid inlet and the valve seat member.

6. A relief valve arrangement as set forth in claim 5 wherein the first stop comprises a cylindrical projecting member extending through the valve member bore.

7. A relief valve arrangement as set forth in claim 6 wherein the end of the first stop is spaced from the valve member when the valve member is in its closed position and when the valve seat member is in its limited position in the second direction of travel.

8. A relief valve arrangement as set forth in claim 7 further including means for providing a second stop for limiting the movement of the valve seat member in the second direction.

9. A relief valve arrangement as set forth in claim 8 wherein the second stop comprises a shoulder against which the biasing force of the biasing means is limited.

* * * * *